United States Patent
Hother et al.

(10) Patent No.: US 6,620,323 B2
(45) Date of Patent: Sep. 16, 2003

(54) APPARATUS AND PROCESS FOR BIOLOGICAL WASTEWATER PURIFICATION

(75) Inventors: Stefan Hother, Düsseldorf (DE); Gerhard Probst, Bonn (DE); Klaus Rocznik, Sankt Augustin (DE); Bernd Striegel, Beckedorf (DE)

(73) Assignee: Axel Johnson Engineering GmbH, Neuss-Grimlinghawsen (DE)

( * ) Notice: Subject to any disclaimer, the term of this patent is extended or adjusted under 35 U.S.C. 154(b) by 159 days.

(21) Appl. No.: 09/745,066

(22) Filed: Dec. 21, 2000

(65) Prior Publication Data

US 2001/0017281 A1 Aug. 30, 2001

(30) Foreign Application Priority Data

Dec. 23, 1999 (DE) .......................... 199 62 793

(51) Int. Cl.[7] ................................. C02F 3/12
(52) U.S. Cl. ................... 210/626; 210/195.3; 210/197; 210/521
(58) Field of Search ............... 210/195.3, 195.4, 210/197, 521, 202, 622, 624, 626

(56) References Cited

U.S. PATENT DOCUMENTS

| | | | | |
|---|---|---|---|---|
| 1,732,386 A | * | 10/1929 | Sprockhoff ............... 210/521 |
| 2,868,384 A | * | 1/1959 | Puddington ............... 210/521 |
| 3,472,764 A | * | 10/1969 | Culp et al. ............... 210/195.3 |
| 3,482,694 A | * | 12/1969 | Rice et al. ............... 210/195.3 |
| 3,807,563 A | * | 4/1974 | Reid, Jr. .................. 210/197 |
| 3,975,276 A | * | 8/1976 | Schmid .................... 210/521 |
| 4,111,802 A | * | 9/1978 | Louboutin ............... 210/195.3 |
| 4,346,005 A | * | 8/1982 | Zimmerman ............. 210/521 |
| 5,192,441 A | * | 3/1993 | Sibony et al. ............ 210/626 |

FOREIGN PATENT DOCUMENTS

| | | |
|---|---|---|
| DE | 196 44 334 A1 | 4/1998 |
| DE | 198 00 664 A1 | 1/1999 |
| EP | 0 890 553 A | 1/1999 |
| WO | 94/11312 A | 5/1994 |

OTHER PUBLICATIONS

Kolisch, G. "Entwicklung von Lamellen zur Feststoffvorabtrennung im Belebungsbecken und erstmalige Installation/Erprobung auf der Klaranlage Wuppertal–Buchenhofen." *Hamburger berichte zur siedlungswasserwirthschaft.* Nov., 1999.

Plass, R. "Untersuchungen zur Erhohung des Trockensubstanzgehaltes im Belebungsbecken durch den Einsatz von Lamellenpaketen." *Hamburger berichte zur siedlungswasserwirtschaft.*

Kolisch, G. "Modified Lamella Technologies for the Economic Upgrading of Sewage Treatment Plants." *Water 21.* IWA Publishing, London. Aug. 2000.

* cited by examiner

Primary Examiner—Christopher Upton
(74) Attorney, Agent, or Firm—Renner, Otto, Boisselle & Sklar, LLP

(57) ABSTRACT

The present invention relates to an apparatus and a process for biological wastewater purification. According to the invention an activation tank (10) is provided in which, with feed of a catalyst, wastewater constituents are degraded by degradation means (11), for example microorganisms, suspended in the wastewater. In the activation tank (10) is disposed at least one lamellae pack (50) in or on which the degradation means (11) suspended in the wastewater are separated out by sedimentation to fall as thickened sedimentation means sludge (11') to the bottom region (15) of the activation tank (10). In the said bottom region (15) of the activation tank (10) is provided forced recirculation (20, 22) of the degradation means, which takes up the thickened degradation means sludge (11') and recirculates it as suspended degradation means (11) back to the activation tank (10).

13 Claims, 5 Drawing Sheets

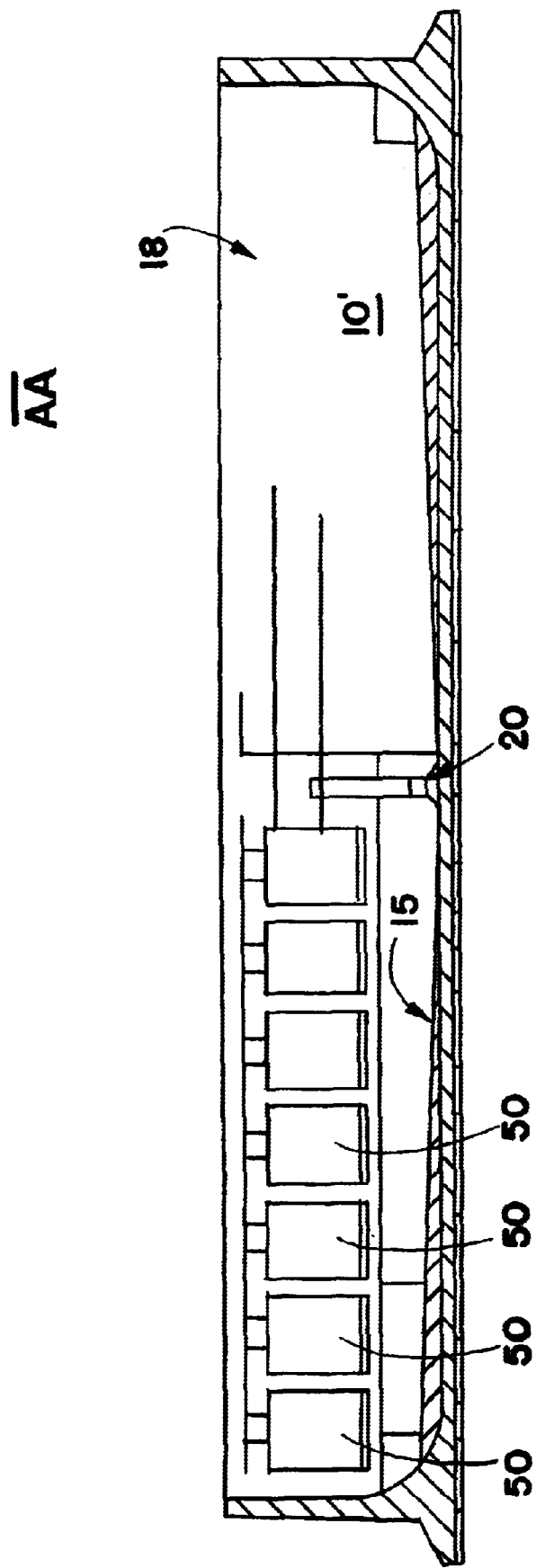

APPARATUS AND PROCESS FOR BIOLOGICAL WASTEWATER PURIFICATION

BACKGROUND OF THE INVENTION

The present invention relates to an apparatus and a process for biological wastewater purification. In particular, the present invention relates to an apparatus and a process for biological wastewater purification in which, in an activation tank, at least one lamellae pack for separating off biologically active bacterial cultures which are suspended in the wastewater is provided, and a forced circulation apparatus which is disposed in the bottom region of the activation tank.

In the prior art it is known per se to provide, for purifying wastewater, activation tanks in which wastewater pollutants are degraded, with supply of oxygen, by biologically active bacterial cultures or microorganisms suspended in the water. It is also known to provide secondary sedimentation tanks in which the biologically active bacterial cultures are separated from the water by sedimentation, the resultant sludge then being pumped back to the activation tank. In the prior art, activation tanks and secondary sedimentation tanks are thus to be considered as an operational unit, since the activation tank and the secondary sedimentation tank form a circuit in which the bacterial density, measured as dry matter content, in the activation tank is a function of the sedimentation action in the secondary sedimentation tank.

Furthermore, in the prior art, for the separation or sedimentation in the secondary sedimentation tank, the use of lamellae separators has been proposed, which employ lamellae packs which consist of a multiplicity of lamellae. The wastewater is passed over these lamellae packs in the secondary sedimentation tank, which, owing to the considerable surface area of the lamellae, leads to the desired separation of the bacterial cultures as sludge.

It is important in this case to differentiate two fundamentally different types of activation tank. Firstly there are the circulation ditches in which the mixed liquor is circulated, and there are sequential-flow tanks in which both the activation tank and the secondary sedimentation tank are connected in series and flow passes through thee sequentially DE-A 43 29 239 discloses a process and an apparatus for biological wastewater purification in which the bacterial content in the activation tank is increased by lamellae packs which are disposed at the flow-path end of the activation tank at a distance from the outlet of the same. Providing the lamellae packs in the activation tank is said to have the advantage that recycling the sedimented bacterial sludge in a separate return sludge stream becomes unnecessary, which avoids destruction of the flock structure via the circulation pumps used. In addition, blockage of the lamellae by sludge deposits or the like is said to be avoided.

SUMMARY OF THE INVENTION

Compared with this prior art, the present invention is based on the inventive observation that the described process and the corresponding apparatus according to the above prior art are unusable industrially. Experiments have found that mounting the lamellae pack at the end of the sequential-flow tank described in the prior art leads to the bacterial sludge which has been separated in or on the lamellae collecting below the lamellae and tailing back into the lamellae pack, from where it is entrained by the wastewater stream towards the secondary sedimentation tank. In the limiting case this leads to the total breakdown of the system.

The present invention thus faces the problem of providing an apparatus and a process for biological wastewater purification which function industrially with high reliability and lead to the desired increase in bacterial content in the activation stage. As a result it becomes possible to avoid capital costs for installing additional tanks for ensuring the required purification performance.

The problem underlying the invention is solved by an apparatus and process for biological wastewater purification according to the present invention.

In detail, the inventive solution according to the present invention is based on providing forced circulation of degradation means in the bottom region of the activation tank below the lamellae pack used. As a result of the wastewater to be purified flowing over the lamellae pack, the degradation means (bacterial cultures or microorganisms) suspended in the wastewater are separated off by sedimentation and fall as thickened degradation means sludge to the bottom region of the activation tank. In the bottom region is provided the forced recycling of degradation means according to the invention which takes up the thickened separated degradation means sludge and recycles it back to the activation tank. By means of the bacteria/microorganism content Increased in this manner in the activation stage, an enhanced performance based on the available reaction space can be achieved.

According to the preferred embodiment of the present invention, there is provided additionally to the activation tank a secondary sedimentation tank in which degradation means remaining in the wastewater are separated off by sedimentation. The resultant thickened degradation means sludge is then recirculated to the activation tank via a return. The double recirculation of the degradation means provided in this manner, once from the end region of the activation tank, and from the secondary sedimentation tank, permits a highly precise setting of the bacterial or microorganism content in the activation tank by using a suitable control circuit.

According to the preferred embodiment of the present invention, the inventive forced recirculation of degradation means consists, firstly, of a transport means, for example a pump or a siphon, and secondly a bottom scraper (for example a Zickert™ scraper or other hydraulically driven sludge scraper). This inventive configuration of the forced recirculation of the degradation means permits, in a particularly efficient manner, firstly collection of the degradation means sludge which is collected in the bottom region of the activation tank below the lamellae, and secondly efficient removal of the collected sludge back to the activation tank.

According to the preferred embodiment of the present invention, the bottom region below the inventive lamellae pack is inclined in relation to the water surface for the forced recirculation of degradation means. The inclination of the bottom region, together with the preferably used bottom scraper permits a particularly efficient collection of the degradation means sludge in the region of the inventively used transport means.

In the preferred embodiment of the present invention, the inventive at least one lamellae pack is disposed at the flow path end in the activation tank, with, in addition, partition over which wastewater flows being provided, which partition prevents direct action of wastewater flow on the at least one lamellae pack. This prevents the flowing wastewater from undesirably making the process of deposition of the bacterial or microorganism cultures on the lamellae turbulent.

Preferred embodiments of the present invention describe two different disposition possibilities of the inventive lamellae pack. In the [] particularly preferred embodiment of the present invention, the lamellae are disposed in parallel to the direction of the wastewater flow. In combination with the partition over which wastewater flows this permits a particularly laminar and controlled wastewater stream which suits the efficient separation in the activation tank.

Further preferred embodiments result from the subclaims which are not discussed here in detail.

BRIEF DESCRIPTION OF THE DRAWINGS

Preferred embodiments of the present invention are to be discussed below with reference to the drawing, in which:

FIG. 2c shows a detail along the line A—A of FIG. 2a perpendicularly to the direction of wastewater flow onto the lamellae unit.

DETAILED DESCRIPTION OF THE INVENTION

Figure 1A:
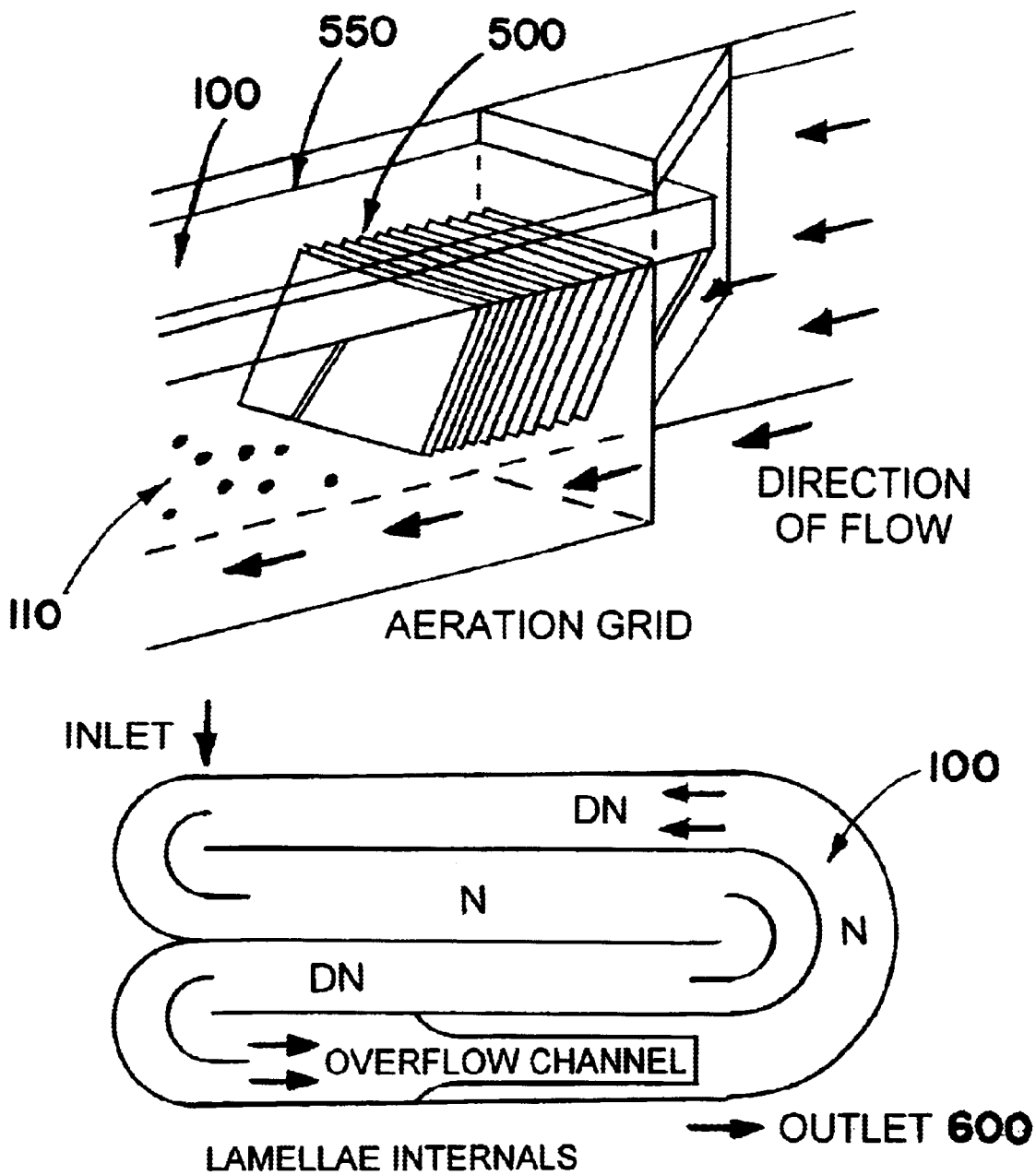
FIG. 1a shows a diagrammatic perspective view of an activation tank of the circulation ditch type for the purposes of illustration.

FIG. 1a shows diagrammatically an activation tank 100 of the circulation type. As can be seen in the lower picture of. FIG. 1a, the wastewater to be clarified enters the activation tank 100 via an inlet and flows through the "activation tank circuit" in a circular manner, as shown by the double arrows. The lamellae internals 500 to be provided, whose lamellae, in the embodiment shown in FIG. 1a, are inclined against the direction of flow, are mounted in such a manner that the wastewater to be clarified together with the degradation means suspended therein (bacterial cultures or microorganisms) flows under the lamellae internals. By providing an overflow channel 550, some of the wastewater is diverted over the lamellae surfaces and leaves the activation tank 100 via an outlet 600 to the secondary sedimentation tank (not shown). Suitable dimensioning and disposition of the lamellae units 500 can achieve the degradation means 110 at present suspended in the wastewater to be clarified separating off on the lamellae surface and sliding downwards along the lamellae surfaces as degradation means sludge. There they are taken up by the underflowing wastewater and again distributed in the activation tank circuit. This means directly, that in an activation tank of the circulation type, the inventive forced recirculation of degradation means is not necessary, since the degradation means sludge which is separated off is taken up by the underflowing wastewater and is thus recirculated back to the activation tank without any special technical measures for sludge return.

Below, with reference to FIG. 1b, an inventive activation tank 10 according to a first preferred embodiment will be described. As can be seen, the activation tank 10 is a sequential-flow tank whose front end together with the inlet is not shown in the above depiction for reasons of simplification. Rather, the rear end of the inventive activation tank 10 is shown together with the outlet 60 which connect the activation tank 10 to a secondary sedimentation tank which is known per se and is not shown in more detail for reasons of simplification. Immediately in the region of the outlet 60 there is the inventive lamellae pack 50 which consists of a multiplicity of individual lamellae which are arranged one behind the other and essentially in parallel. The structure of a lamellae separator is known in the prior art and does not need to be discussed in detail here. The installation of the lamellae pack depends on the type of lamellae used. In the exemplary embodiment shown in FIG. 1b, the lamellae are inclined upwards towards the outlet 60; a partition which is to be disposed upstream of the lamellae pack and has an overflow edge or an underflow breakthrough was not provided for reasons of simplification. However, it is obvious to those skilled in the art that, depending on the type of lamellae used, differing lamellae orientations with and without upstream partitions which the flow passes over or under can be provided.

In the inventive operation of the lamellae separator, the wastewater to be clarified flows over the lamellae surfaces, the degradation means suspended in the wastewater (which are referred to below only as bacterial cultures, for the sake of simplicity) separating off on the lamellae surfaces and, owing to the lamellae slope, collecting as thickened bacterial sludge in the bottom region 15 of the lamellae pack. According to the invention, a degradation means sludge forced recycling 20, 22 is then provided, which is only shown diagrammatically in the embodiment depicted in FIG. 1b. The purpose of the inventive degradation means sludge forced recycling 20, 22 is to take up the bacterial sludge collected in the bottom region 15 and transport it back to the inlet of the activation tank, where it is again fed to the sedimentation circuit within the activation tank 10 together with the newly influent wastewater.

Figure 1B:
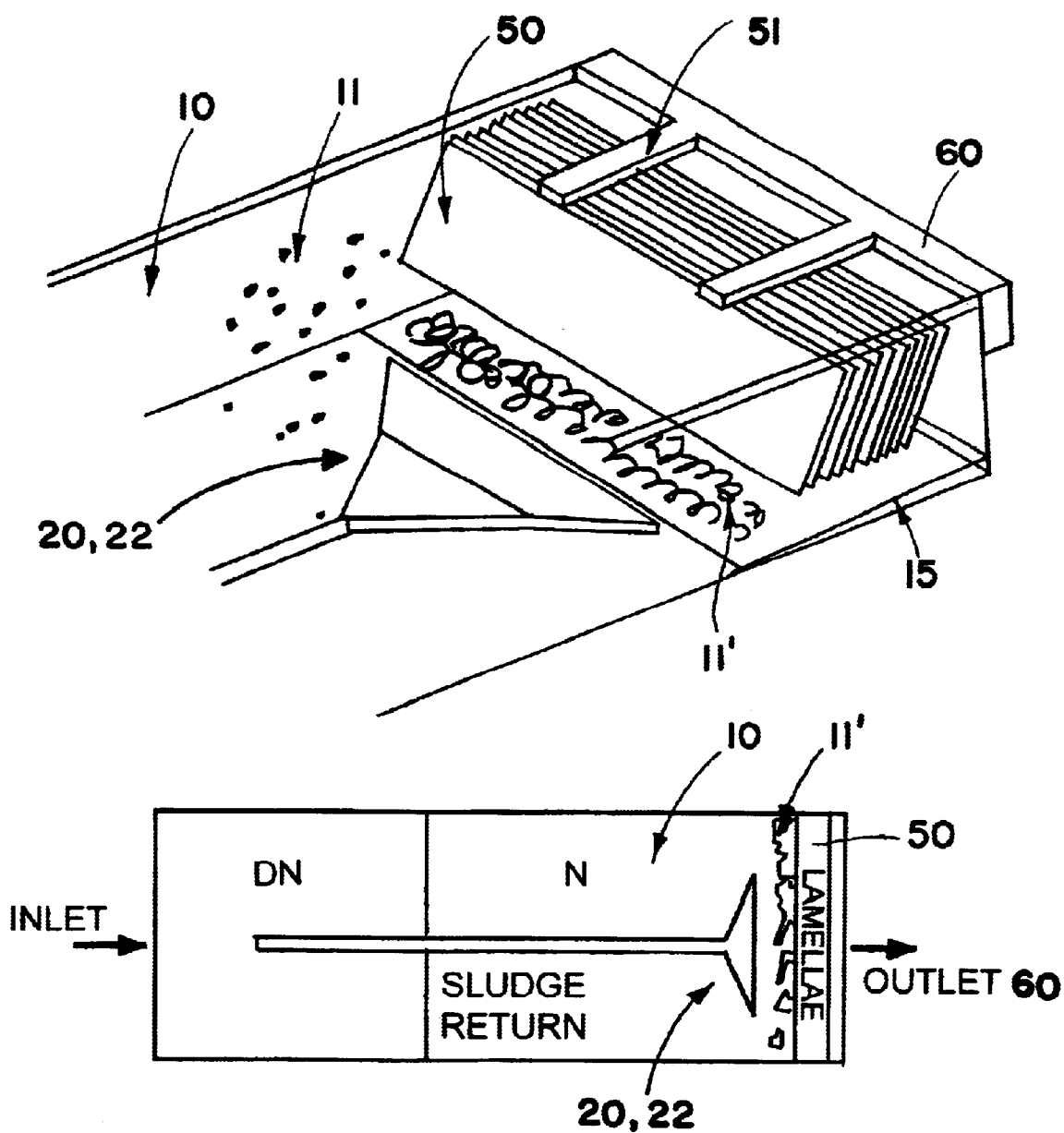
FIG. 1b shows a diagrammatic perspective view of an activation tank of the sequential flow type according to a first preferred embodiment of the present invention.

Not shown in FIG. 1b, as mentioned above, is the secondary sedimentation tank which is downstream of the outlet 60 and in which the bacterial cultures remaining in the effluent wastewater are separated off separately and are then collected. The bacterial cultures separated off in this manner in the secondary sedimentation tank are also fed back via the inlet to the activation tank 10. Because of the separate recirculation of the bacterial cultures both within the activation tank and from the secondary sedimentation tank, [lacuna] may be [lacuna] using suitable control electronics. Preferably, this is accomplished by controlling the flow velocity of the wastewater to be clarified between the lamellae and as a result the separation rate of the degradation means using control valves mounted in the outlet of the individual lamellae packs.

Figure 2A:
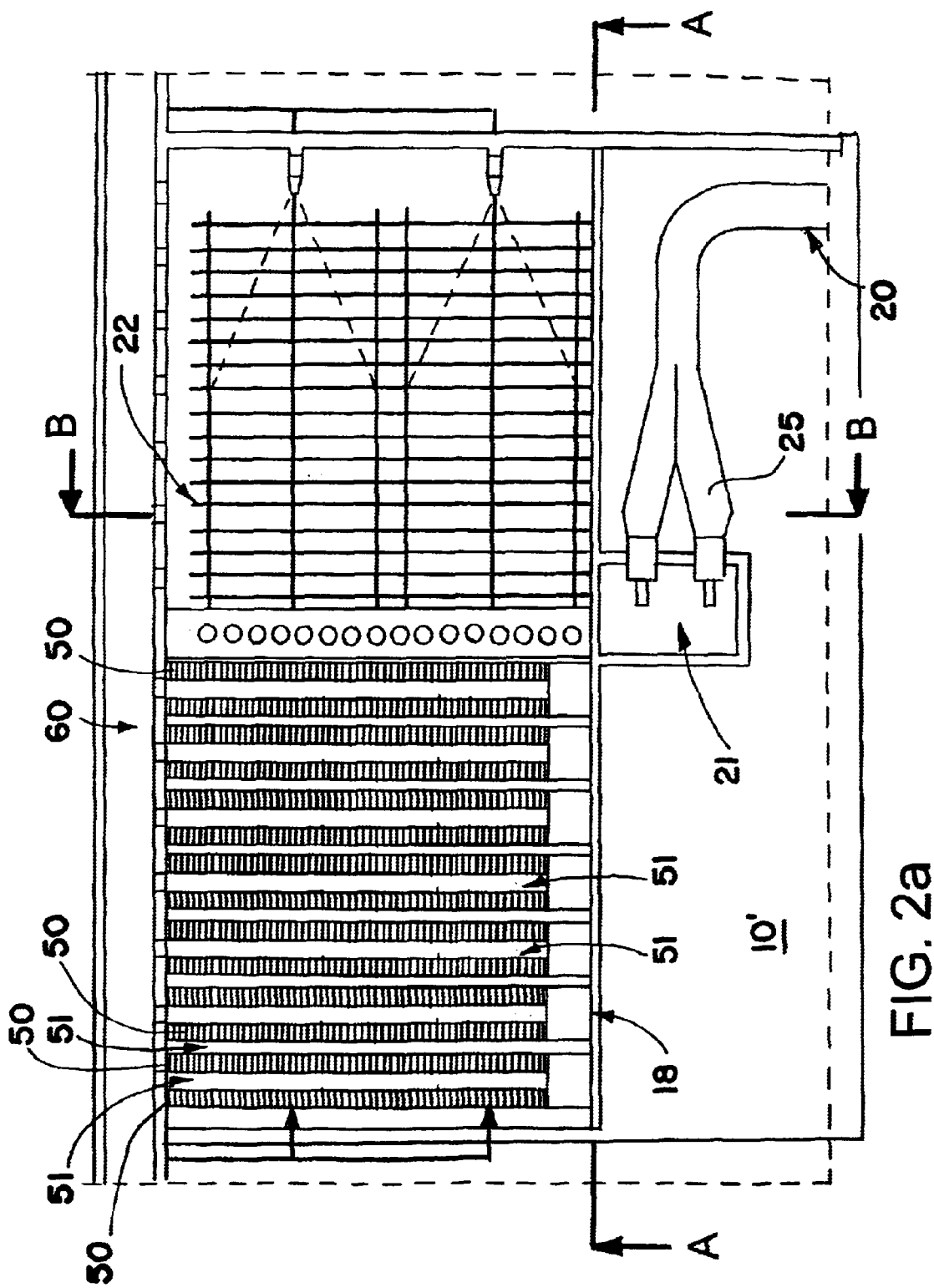
FIG. 2a shows a detail of the end region of a sequential-flow activation tank according to a second preferred embodiment of the present invention having lamellae packs disposed in parallel to the direction of wastewater flow.
Figure 2B:
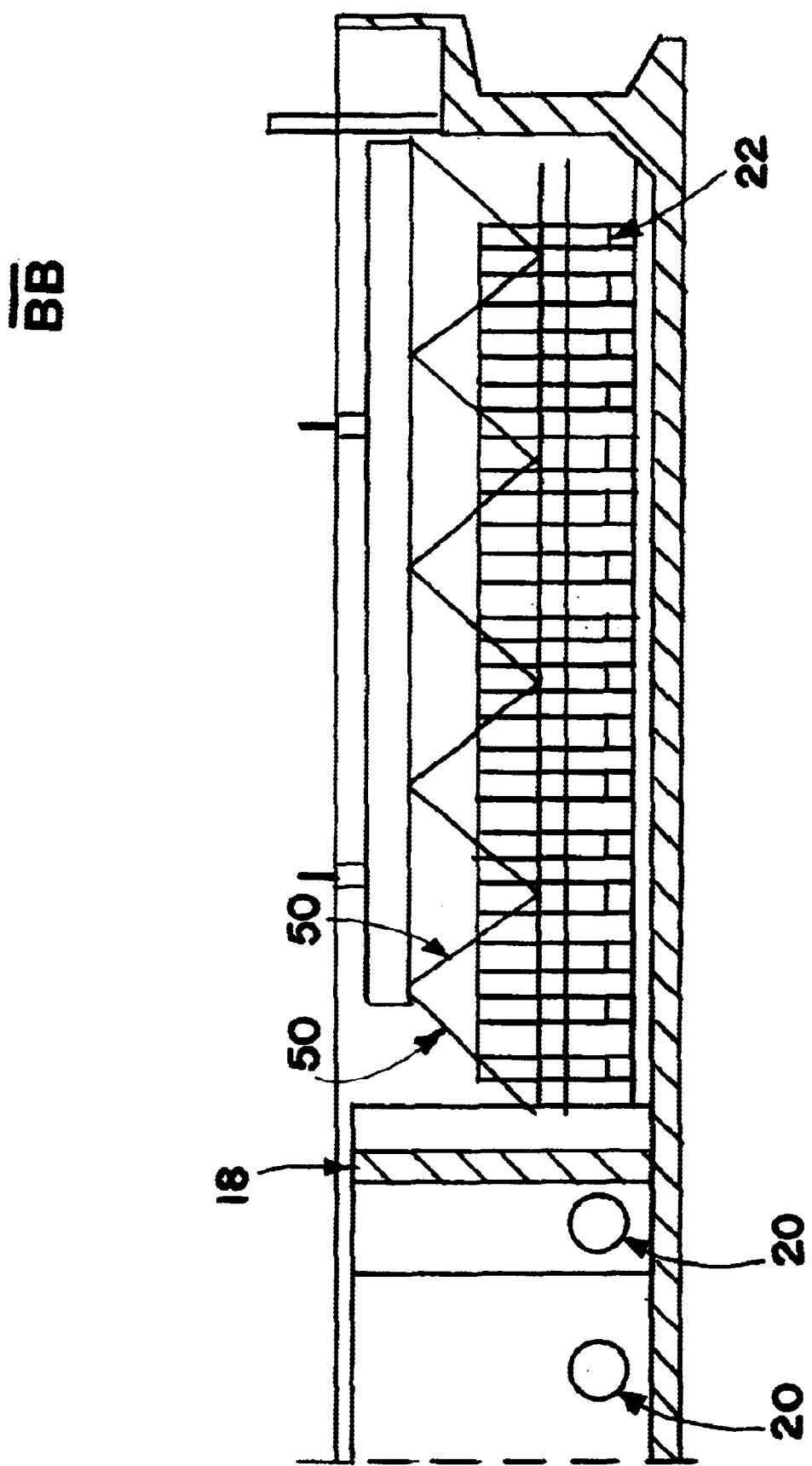
FIG. 2b shows a detail along the line B—B of FIG. 2a in the direction of flow through the lamellae.

In FIGS. 2a, 2b, 2c a further inventive embodiment of an activation tank 10' is shown. In this embodiment also, the inventive lamellae packs 50 are installed at the tank end of the activation tank 10'. Between the activation tank 10' and the lamellae pack 50 is installed an intermediate wall 18 which flow passes over, which intermediate wall avoids disturbance of sludge deposition below the lamellae due to unwanted currents or unwanted air introduction from the aerated activation tank 10'. The wastewater containing the bacterial cultures suspended therein flows over the said partition 18 and is introduced at the side between the inventive lamellae packs 50. The lamellae are at an angle of 60 degrees with a defined distance from one another. The wastewater enters laterally into the lamellae in order to interfere as little as possible with the separation operation within a lamella intermediate space. In the lamella intermediate space, some of the bacterial cultures suspended in the water separate off onto the lamellae surfaces. The wastewater stream which is low in solids to this extent flows upwards here and is taken off via the lamellae linearly by means of channels or immersed tubes. This stream is passed on for secondary sedimentation in a secondary sedimentation tank (not shown).

The bacterial cultures which have sedimented on the lamellae surfaces 50 fall downwards owing to gravity and thus thicken. At the end of the lamellae plates the resultant bacterial sludge slips off and falls to the bottom. Since owing to the partition, interferences among the lamellae are avoided, the degree of sludge thickening achieved can be maintained or further increased at the bottom region 15.

According to a preferred embodiment, the bottom beneath the lamellae packs 50 is designed to have a slight drop, as can be seen in particular in FIG. 2c. Centrally, at the lowest point of the activation tank 10', there is the inventive transport means 20, which is preferably designed as a pump or siphon. Together with the bottom scraper 22, which can be seen in particular in FIG. 2a and is preferably designed as a hydraulically driven sludge scraper (for example, a Zickert™ scraper), the transport means and the bottom scraper 22 form the inventive forced recirculation of degradation means sludge which transports the bacterial sludge sedimented in the bottom region 15 back to the inlet of the activation tank 10'. As a result of providing the inventive drop in the bottom region 15, the sedimented bacterial sludge slides down in the direction of the inventive transport means 20. This sliding process is reinforced by the bottom scraper 22, which thus primarily does not serve for pushing the sedimented sludge (for this purpose shield heights of a few centimeters, as preferably used, would be too small), but rather for overcoming the bottom adhesion and thus for reinforcing the sliding of the sludge. The drop and the bottom scraper 22 ensure that upstream of the transport means 20 a sufficient sludge buffer is always present. The sludge is preferably transported on the basis of a communicating pipe. For this purpose, in a sludge collection channel, via pumps, a somewhat lower water level can be constantly set than in the activation tank, as a result of which the differing water level heights become the driving force which lift the sludge out of the collection space into the sludge collection rails. The lifting operation can be increased by introducing air into the riser pipes.

According to a further preferred embodiment, on the bottom, a slit-like inlet construction (not shown) is provided, which is intended to make possible linear extraction by suction of the sludge store. The sedimented sludge in the sludge collection channel is returned via a pump to the inlet of the activation tank 10'. From this transport rate there also results the water level difference necessary for lifting the bacterial sludge.

Details of the structure of the second inventive embodiment are described in more detail below with reference to FIGS. 2a, 2b, 2c.

FIG. 2a shows a detailed view of the inventive lamellae packs 50. In the left-hand half of the picture, the plan view onto the lamellae packs and the intermediate outlet channels 51 is shown. In the middle there can be seen the inventive sludge siphon construction together with the sludge siphon tubes shown as circles. On the right-hand side there can be seen the hydraulically driven sludge scraper. Specifically a Zickert™ scraper 22, which is particularly preferred according to the invention, and can be slid in parallel to the bottom of the activation tank 10" perpendicularly to the direction of wastewater flow. At the bottom of FIG. 2a can be seen the abovementioned sludge collection shaft 21 and the pump arrangement 25 for pumping off the bacterial sludge.

FIG. 2b shows a section along the line B—B of FIG. 2a. In the left-hand picture area, the inventive transport means 20 can be seen and also the partition 18 in a partial section in the direction of wastewater flow. The 60 degree inclination of the inventive lamellae packs 50 can clearly be seen, and the bottom scraper 22 disposed below the lamellae packs 50.

FIG. 2c, which corresponds to a partial section along line A—A from FIG. 2a, corresponds to the view transversely to the direction of wastewater flow onto the lamellae unit 50. Although the plant is symmetrically designed, only the left subwing is shown for clearer representation.

What is claimed is:

1. An apparatus for biological wastewater purification comprising:

a) an activation tank in which, with supply of a catalyst, wastewater constituents are degraded by degradation means suspended in the wastewater;

b) at least one lamellae pack disposed in the activation tank for separating the degradation means from the wastewater by sedimentation, to fall as thickened degradation sludge into the bottom region of the activation tank; and c) means for recirculating the degradation sludge which is disposed in the bottom region of the activation tank, which recirculating means takes up the thickened degradation sludge and recirculates it back toward an inlet of the activation tank as suspended degradation means for suspension in the wastewater, and wherein the recirculating means includes a sludge collection channel and at least one siphon pipe in communication with the bottom region of the activation tank and the sludge collection channel for transport of the degradation sludge from the bottom region of the activation tank to the sludge collection channel via a siphoning action.

2. An apparatus for biological wastewater purification according to claim 1, characterized in that the catalyst includes at least one of air and oxygen, and further comprising at least one nozzle for blowing the catalyst into the activation tank.

3. An apparatus for biological wastewater purification according to claim 1, characterized in that the degradation means includes at least one of biologically active bacterial cultures and microorganisms which degrade wastewater constituents into biologically harmless end products.

4. An apparatus for biological wastewater purification according to claim 1, further comprising a secondary sedimentation tank which is operationally connected to the activation tank and in which the degradation means remaining in the wastewater are separated off by sedimentation to be recirculated as degradation sludge to the activation tank via a return.

5. An apparatus for biological wastewater purification according to claim 4, characterized in that lamellae separators are provided in the secondary sedimentation tank.

6. An apparatus for biological wastewater purification according to claim 1, characterized in that the recirculating means further comprises a bottom scraper which interacts operationally with the siphon pine to collect the degradation sludge which has collected in the bottom region of the activation tank.

7. An apparatus for biological wastewater purification according to claim 6, characterized in that the recirculating means includes at least one pump for transporting the degradation sludge from sludge collection channel to the inlet of the activation tank.

8. An apparatus for biological wastewater purification according to claim 6, characterized in that the bottom scraper is a hydraulically driven sludge scraper.

9. An apparatus for biological wastewater purification according to claim 6, characterized in that the lamellae of the at least one lamellae pack are disposed in parallel to the direction of wastewater flow and the bottom scraper scrapes the degradation sludge in the bottom region to the transport means, where it is taken up by the transport means.

10. An apparatus for biological wastewater purification according to claim 1, characterized in that the bottom region extends to below at least one lamellae pack and comprises a bottom piece which is inclined in relation to the wastewater surface for forced recirculation of degradation means, the inclination of which bottom piece reinforces the recycling of the degradation sludge.

11. An apparatus for biological wastewater purification according to claim 1, characterized in that the activation tank is a sequential-flow tank in which the at least one lamellae pack is disposed at the flow path end and in addition an open partition is provided upstream, which partition presents direct action of wastewater flow on the at least one lamellae pack.

12. An apparatus for biological wastewater purification according to claim 11, characterized in that the lamellae of the at least one lamellae pack are disposed perpendicularly to the direction of wastewater flow and are inclined upwards away from the partition.

13. A process for biological wastewater purification which comprises the following steps:
   a) feeding a catalyst into an activation tank for degrading water constituents by degradation means suspended in the wastewater;
   b) disposing at least one lamellae pack in the activation tank in order to separate off the degradation means suspended in the wastewater by sedimentation, the degradation means separated off falling as degradation sludge into the bottom region of the activation tank; and
   c) recirculating the degradation sludge which has sunk in the bottom region of the activation tank, to the inlet of the activation tank via a siphoning action through at least one siphon pipe in communication with a bottom region of the activation tank and a sludge collection channel.

* * * * *